(12) United States Patent
Shimizu

(10) Patent No.: US 10,017,630 B2
(45) Date of Patent: Jul. 10, 2018

(54) CARBON FIBER-REINFORCED PLASTIC MATERIAL WITH NANOFILLER MIXED THEREIN, AND MANUFACTURING METHOD THEREOF

(71) Applicant: NATIONAL INSTITUTE OF ADVANCED INDUSTRIAL SCIENCE AND TECHNOLOGY, Chiyoda-ku, Tokyo (JP)

(72) Inventor: Hiroshi Shimizu, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 14/332,530

(22) Filed: Jul. 16, 2014

(65) Prior Publication Data
US 2015/0018473 A1 Jan. 15, 2015

Related U.S. Application Data

(63) Continuation of application No. PCT/JP2013/050755, filed on Jan. 17, 2013.

(30) Foreign Application Priority Data

Jan. 17, 2012 (JP) ................. 2012-007336

(51) Int. Cl.
| | | |
|---|---|---|
| C08K 7/06 | (2006.01) | |
| C08K 3/04 | (2006.01) | |
| C08K 3/34 | (2006.01) | |
| B29B 7/90 | (2006.01) | |
| B29C 47/86 | (2006.01) | |
| B29C 47/92 | (2006.01) | |
| C08L 77/02 | (2006.01) | |
| C08L 77/06 | (2006.01) | |
| B29B 7/00 | (2006.01) | |
| B29B 7/14 | (2006.01) | |
| B29B 7/28 | (2006.01) | |
| C08J 5/10 | (2006.01) | |
| B29C 47/10 | (2006.01) | |
| B29K 105/16 | (2006.01) | |
| B29C 47/00 | (2006.01) | |
| B29C 47/14 | (2006.01) | |

(52) U.S. Cl.
CPC ............... *C08K 7/06* (2013.01); *B29B 7/005* (2013.01); *B29B 7/14* (2013.01); *B29B 7/286* (2013.01); *B29B 7/90* (2013.01); *B29C 47/109* (2013.01); *B29C 47/862* (2013.01); *B29C 47/92* (2013.01); *C08J 5/10* (2013.01); *C08K 3/04* (2013.01); *C08K 3/34* (2013.01); *C08K 3/346* (2013.01); *C08L 77/02* (2013.01); *C08L 77/06* (2013.01); *B29C 47/0014* (2013.01); *B29C 47/0021* (2013.01); *B29C 47/14* (2013.01); *B29C 2947/92209* (2013.01); *B29C 2947/92409* (2013.01); *B29C 2947/92704* (2013.01); *B29K 2105/162* (2013.01); *C08K 2201/011* (2013.01); *C08K 2201/016* (2013.01)

(58) Field of Classification Search
CPC ............... C08K 3/04; C08K 3/34; C08K 7/06
See application file for complete search history.

(56) References Cited

U.S. PATENT DOCUMENTS

| | | | |
|---|---|---|---|
| 2003/0078331 A1* | 4/2003 | Kim | ................ C08L 25/06 524/425 |
| 2009/0123731 A1 | 5/2009 | Shimizu et al. | |
| 2011/0124793 A1 | 5/2011 | Shimizu | |
| 2011/0152435 A1 | 6/2011 | Morishita et al. | |

FOREIGN PATENT DOCUMENTS

| | | |
|---|---|---|
| DE | 102008038943 A1 | 2/2010 |
| EP | 0 564 660 A1 * | 10/1993 |
| EP | 2792712 A1 | 10/2014 |
| JP | H3-103474 A | 4/1991 |
| JP | 5-221472 A | 8/1993 |
| JP | H6-279615 A | 10/1994 |
| JP | H8-183878 A | 7/1996 |
| JP | 2001-151900 A | 6/2001 |
| JP | 2002-060618 A | 2/2002 |
| JP | 2004-510870 A | 4/2004 |
| JP | 2006-225548 A | 8/2006 |
| JP | 2008-150400 A | 7/2008 |

(Continued)

OTHER PUBLICATIONS

Machine translation of JP 2011-105836 A, Jun. 2, 2011.*
European Search Report dated Aug. 14, 2015 for the counter European application No. 13738738.7.
Chinese Office Action dated Mar. 29, 2016 for the counter Chinese application No. 201380005843.4.
Japanese Office Action dated Jul. 26, 2016 for the counter Japanese application No. 2013-554323.
Chinese Office Action dated Oct. 10, 2016 for the counter Chinese application No. 201380005843.4.

(Continued)

*Primary Examiner* — Vickey Nerangis
(74) *Attorney, Agent, or Firm* — Hauptman Ham, LLP

(57) ABSTRACT

Provided is a carbon fiber reinforced plastic material having excellent rigidity, flexibility and improved heat resistance and a method of manufacturing the same. The present invention provides a carbon fiber reinforced plastic material containing 2 parts by mass or more and 30 parts by mass or less of a nanofiller with respect to a total of 100 parts by mass of 30 parts by mass or more and 90 parts by mass or less of a polymer material and 70 parts by mass or more and 10 parts by mass or less of carbon fibers, an average aspect ratio (length/width) of the nanofiller being 20 or more. The average aspect ratio (length/width) of the nanofiller may also be 50 or more.

9 Claims, 10 Drawing Sheets

(56) References Cited

FOREIGN PATENT DOCUMENTS

| JP | 2008-266577 A | 11/2008 |
|---|---|---|
| JP | 2010-059303 A | 3/2010 |
| JP | 2010-100837 A | 5/2010 |
| JP | 2011-105836 A | 6/2011 |
| JP | 2012-515805 A | 7/2012 |
| WO | 02/28971 A1 | 4/2002 |
| WO | 2010/084149 A1 | 7/2010 |

OTHER PUBLICATIONS

Zhang Tiejun, "Materials for Mechanical Engineering", Feb. 2011, p. 236-241, Peking University Press.
European Patent Office Action dated Dec. 8, 2016 for the counter European application No. 13 738 738.7.
Chinese Office Action dated Mar. 9, 2017 for Chinese Patent Application No. 201380005843.4.
European Patent Office dated Jun. 27, 2017 for European Patent Application No. 13 738 738.7.
Chinese Office Action dated Oct. 9, 2017 from SIPO in connection with the counterpart Chinese Patent Application No. 201380005843.4 with a partial English translation.
Shang-Han Wu, et al., Material Letter 49 (2001) 327-333, "Mechanical, thermal and morphological properties of glass fiber and carbon fiber reinforced polyamide-6 and polyamide-6rclay nanocomposites", Elsevier Science B.V., Jul. 2001.
International Search Report issued in PCT/JP2013/050755 dated Apr. 16, 2013.
International Preliminary Report on Patentability issued in PCT/JP2013/050755 dated Apr. 16, 2013.

* cited by examiner

CARBON FIBER-REINFORCED PLASTIC MATERIAL WITH NANOFILLER MIXED THEREIN, AND MANUFACTURING METHOD THEREOF

CROSS REFERENCE TO RELATED APPLICATIONS

This application is based upon and claims the benefit of priority from the prior Japanese Patent Application No. 2012-007336, filed on Jan. 17, 2012, and PCT Application No. PCT/JP2013/050755, filed on Jan. 17, 2013, the entire contents of which are incorporated herein by reference.

FIELD

The present invention relates to a carbon fiber reinforced plastic material and method for manufacturing the material. In particular, the invention is related to a carbon fiber reinforced plastic material mixed with a nanofiller and a method for manufacturing the material.

BACKGROUND

Carbon fiber reinforced plastics (CFRP) are a material in which highly carbon fibers are highly filled in a generic plastic and have significantly improved rigidity compared to plastic alone. Since CFRP has a rigidity which can substitute for a metal, it is already beginning to be used in fuselages of airplanes and automobile bodies etc and has achieved significant weight reduction thereof. Recently, CFRP has spread to uses such as automotive parts and sporting goods. Therefore, further improvement of the mechanical properties of CFRP is required.

For example, CFRP mixed with glass fiber (GF) or carbon fiber (CF) in polyamide 6 containing clay is described in S. Wu, F. Wang, C. M. Ma, W. Chang, C. Kuo, H. Kuan, W. Chen, Mater Lett. 49 (2001) 327. In S. Wu, F. Wang, C. M. Ma, W. Chang, C. Kuo, H. Kuan, W. Chen, Mater Lett. 49 (2001) 327, when mixing glass fibers or carbon fibers in polyamide 6 containing 3% of montmorillonite as clay, tensile strength and modulus of elongation improve with increasing content of the glass fibers or carbon fibers. However, a resin containing clay has a heat resistance of about 240° C. to 250° C. and cannot be applied to parts that require further heat resistance.

On the other hand, a polyamide resin composition containing carbon particles and a swelling fluorine mica-based clay mineral layered silicate is disclosed in Japanese Laid Open Patent No. 2008-150400. The swelling fluoroine mica-based clay mineral has a high heat resistance compared to clay and can be processed at 300° C. or more. However, the content of carbon particles in the polyamide resin composition disclosed in Japanese Laid Open Patent No. 2008-150400 is 0.5 to 10 parts by mass, and for example, chopped carbon fibers (chopped CF) which are shortened cannot be applied to a process for highly filling into plastic. In CFRP, since uniformity in the dispersion state of the carbon fibers is significantly reduced when the filling amount of the carbon fiber is more than 40 wt %, ductility which is a feature of the plastic and formability is not only significantly lost but the smoothness of the surface material is also lost. Therefore, while maintaining the desired stiffness as a whole system, a technology to evenly disperse the carbon fibers and which does not degrade the performance of the plastic is required.

SUMMARY

The present invention aims to solve the above problems by providing a carbon fiber reinforced plastic material with excellent rigidity and flexibility and improved heat resistance and a manufacturing method thereof.

According to one embodiment of the present invention, a carbon fiber reinforced plastic material is provided including 2 parts by mass or more and 30 parts by mass or less of a nanofiller with respect to a total of 100 parts by mass of 30 parts by mass or more and 90 parts by mass or less of a polymer material and 70 parts by mass or less and 10 parts by mass or more of carbon fibers, an average aspect ratio (length/width) of the nanofiller being 20 or more.

As a preferred composition of this material, it is preferred to knead 2 parts or more by mass and 30 parts by mass or less of a nanofiller with respect to a total of 100 parts by mass of 60 parts by mass or more and 90 parts by mass or less of the polymer material and 70 parts by mass or less and 10 parts by mass or more of the carbon fibers. In this way, it is possible to securely maintain uniformity in a dispersion state of carbon fibers and it is possible to improve ductility and molding processing capability which are original characteristics of a polymer, and further improve smoothness of a material surface.

In the carbon fiber reinforced plastic material, an average aspect ratio (length/width) of the nanofiller may be 50 or more.

In addition, according to one embodiment of the present invention, a carbon fiber reinforced plastic material is provided including 2 parts by mass or more and 30 parts by mass or less of a layered silicate with respect to a total of 100 parts by mass of 30 parts by mass or more and 90 parts by mass or less of polyamide and 70 parts by mass or less and 10 parts by mass or more of carbon fibers.

A modulus of elongation of carbon fiber reinforced plastic material is 6000 MPa or more.

In addition, according to one embodiment of the present invention, a method of manufacturing a carbon fiber reinforced plastic material is provided including supplying a carbon fiber reinforced plastic raw material including a polymer material or polyamide resin, carbon fiber and a nanofiller within a cylinder, and performing melt-kneading by providing a shear flow field and a stretching field.

In addition, according to one embodiment of the present invention, a method of manufacturing a carbon fiber reinforced plastic material is provided including supplying a carbon fiber reinforced plastic raw material including a polymer material or polyamide resin, carbon fiber and a nanofiller within a cylinder to a melt-kneading apparatus mounted with an internal feedback type screw which can shift again a melt-kneaded product of a raw material sent to a rear end direction of a screw, and performing melt kneading by circulating for a fixed time period under the following conditions, heating at 150° C. or more and 500° C. or less, a number of rotations of the screw is 200 rpm or more and 3000 rpm or less, and a shear rate of 300 $sec^{-1}$ or more and 4500 $sec^{-1}$ or less.

In the method of manufacturing a carbon fiber reinforced plastic material, the polymer material may be selected from a thermoplastic resin, a thermosetting resin and elastomer or rubber.

In the method of manufacturing a carbon fiber reinforced plastic material, the nanofiller may be a layered silicate.

In the method of manufacturing a carbon fiber reinforced plastic material, the layered silicate may be a mica.

In the method of manufacturing a carbon fiber reinforced plastic material, the mica may have an average aspect ratio (length/width) of 20 or more and preferably 50 or more.

According to an embodiment of the present invention, an automobile part is provided including the carbon fiber reinforced plastic material described in any of the above.

According to an embodiment of the present invention, a sports part is provided including the carbon fiber reinforced plastic material described in any of the above.

According to an embodiment of the present invention, an information terminal device is provided including the carbon fiber reinforced plastic material described in any of the above.

REFERENCE SIGNS LIST

Figure 1:
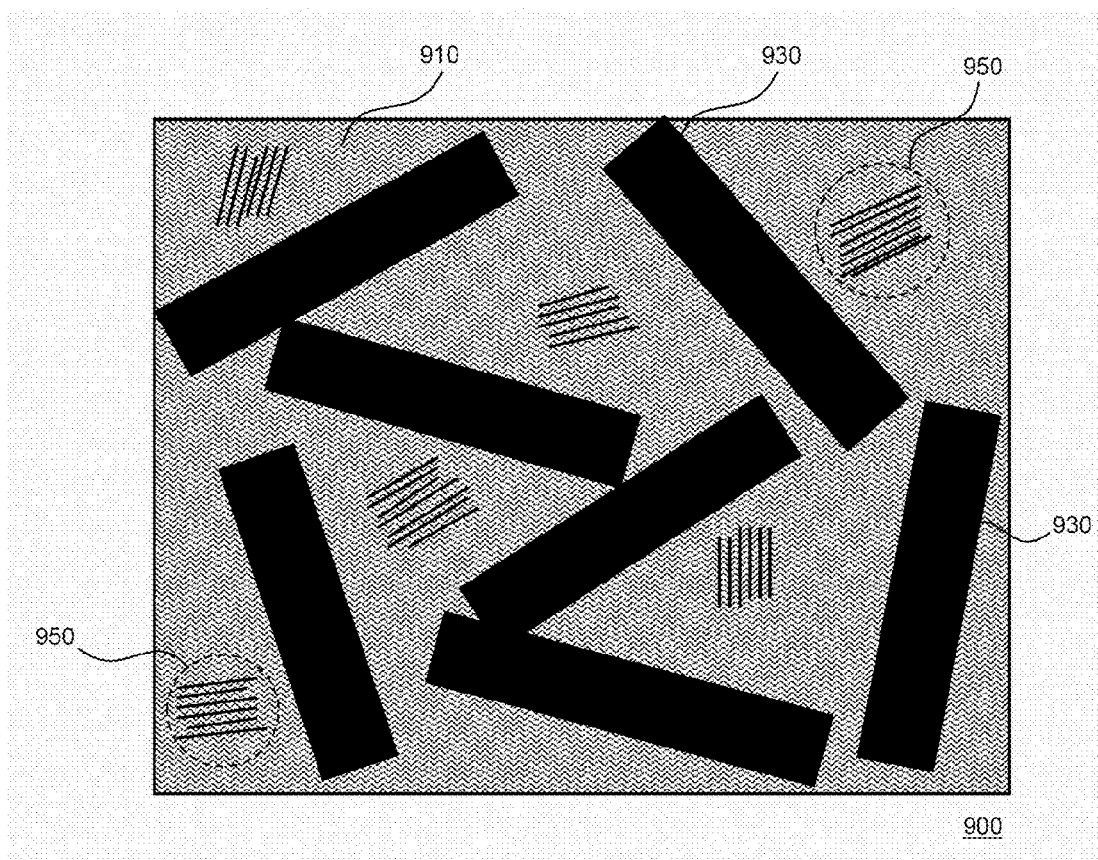
FIG. 1 is a structural schematic view of a carbon fiber reinforced plastic material 900 was prepared by a melt-kneading method according to conventional technology.

10: melt-kneaded product manufacturing equipment, 12: melt-kneading section, 14: mold section, 16: raw material supply unit, 18: cylinder, 20: internal feedback type screw, 22: Bearing, 24: Shaft, 26: Heater, 28: Seal, 30: adjusting means for adjusting a gap, 32: gap, 35: Heater, 36: T-die front end unit heater, 38: T-die rear end unit heater, 40: discharge opening, 42: thermocouple, 44: hole, 46: structure of internal feedback screw, 48: screw rear section, 50: screw front section, 100: Carbon fiber reinforced plastic material, 110: polymer material, 130: carbon fiber, 150: nanofiller, 200: plastic material, 210: polymer material (polyamide 6), 220: crystallization part of polyamide 6, 250: mica, 900: Carbon fiber reinforced plastic material, 910: polymer material, 930: carbon fiber, 950: nanofiller.

DESCRIPTION OF EMBODIMENTS

A carbon fiber reinforced plastic material mixed with a nanofiller related to the present invention and a method for manufacturing the same is explained below with reference to the drawings. However, the carbon fiber reinforced plastic material mixed with a nanofiller of the present invention and a method for manufacturing the same is not to be construed as being limited to the description of the embodiments and examples shown below. Furthermore, in the drawings to be referenced in the embodiments and examples, the same reference numerals are given to parts having similar functions or the same parts and repetitive descriptions thereof are omitted.

In order to solve the technical problems described above, the present invention provides ternary materials in which a nanofiller represented by auxiliary layered silicates as well as carbon fibers represented by chopped CF are added to a plastic and is characterized in that this layered nano-filler is dispersed and arranged microscopically. It is preferred that these nanofillers be dispersed using high shear molding in order to disperse and arrange microscopically within a plastic. In the prior art documents described above, since a nanofiller is not dispersed and arranged microscopically in a plastic, it was difficult to realize a carbon fiber reinforced plastic material obtained by mixing with the nanofiller related to the present invention and a method of manufacturing the same.

FIG. 1 is a structural schematic view of the carbon fiber reinforced plastic material 900 prepared using a melt-kneading method according to the conventional technology. The carbon fiber reinforced plastic material 900 includes a polymer material 910, carbon fibers 930 and a nanofiller 950. Since the nanofiller 950 has a strong cohesive force, because application of shear stress is not sufficient using the melt-kneading method according to the conventional technology, in the schematic drawing of FIG. 1 depicting a layered silicate as a model of the nanofiller 950, the appearance of dispersion and arrangement of a multilayered silicate in a stacked structure in a base material of the polymer material 910 is shown. Usually, in the case where this nanofiller 950 is stacked in multilayers, the width is 20 nm or more. Therefore, the average aspect ratio (length/width) of the nanofiller 950 in this case is 10 at most or less.

Figure 2:
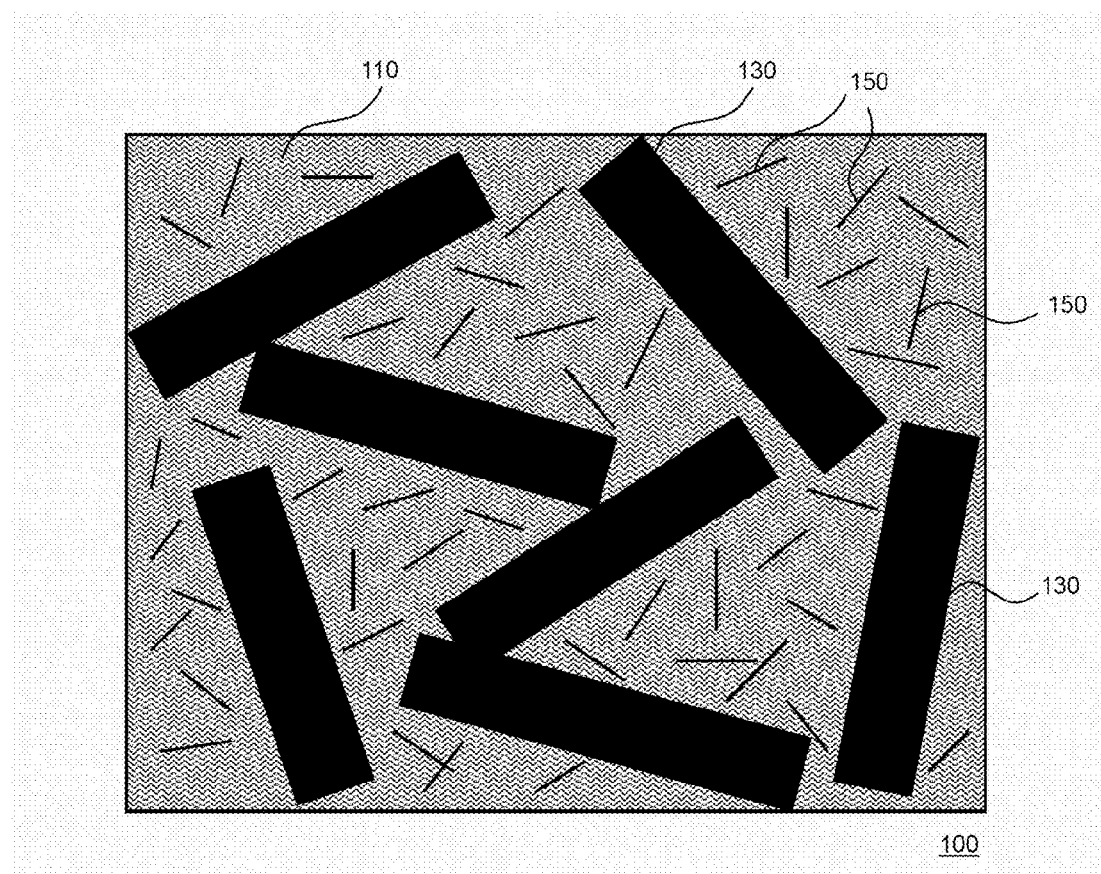
FIG. 2 is a schematic view of a carbon fiber reinforced plastic material 100 according to one embodiment of the present invention.

In contrast, a schematic view of a carbon fiber reinforced plastic material 100 related to the present invention is depicted in FIG. 2. The carbon fiber reinforced plastic material 100 includes a polymer material 110, carbon fibers 130 and a nanofiller 150. The carbon fiber reinforced plastic material 100 related to the present invention has a structure in which the nanofiller 150 and carbon fibers 130 are dispersed and arranged microscopically in the polymer material 110 which is a base material. In the present embodiment, nanofiller 150 is applied with a strong shear flow field or stretching field and thereby it is possible to be dispersed in an almost isolated state an effectively adhered to the polymer material 110 without aggregation throughout the matrix of the polymer material 110 as well as peeling within the polymer material 110.

Furthermore, the addition amount of nanofiller is depicted in the state in the case of using almost the same weight in FIGS. 1 and 2. In other words, the nano-filler 150 in FIG. 2 is dispersed in a state whereby the number of layers is very low and each layer is independent due to peeling. In the case where the width is around 2 nm and length is 100 nm or more, the average aspect ratio (length/width) is around 50 mm. The average aspect ratio is preferred to be 20 or more, preferably 50 or more and sometimes more than 100. That is, the dynamic performance is improved significantly since a polymer chain is reinforced by the addition of thick and large carbon fibers to the polymer chain as well as many nanofillers.

(Polymer Material)

Polymer materials which can be used in the carbon fiber reinforced plastic material 100 related to the present embodiment may be selected from thermoplastic resins, thermosetting resins or elastomers. Examples of the thermoplastic resin include polyolefin resins (for example high-density polyethylene (HDPE), low density polyethylene (LDPE), ultrahigh molecular weight polyethylene (UHMWPE), polypropylene (PP) such as isotactic polypropylene and syndiotactic polypropylene, ethylene polypropylene copolymer resin), polyamide resin (for example, nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 copolymer (N6/66/610), nylon MXD6 (MXD6), nylon 6T, nylon 6/6T copolymer, nylon 66/PP copolymer, nylon 66/PPS copolymer), polyester resin (for example, polylactic acid (PLLA), polycarbonate (PC), polybutylene terephthalate (PBT), polyethylene terephthalate (PET), polyethylene isophthalate (PEI), polyester copolymer, PET/PEI copolymer, polyarylate (PAR), polybutylene naphthalate (PBN), liquid crystal polyesters and aromatic polyester such as polyoxyalkylene diimide acid/poly butyrate terephthalate copolymer), polyether-based resins (for example, polyacetal (POM), polyphenylene oxide (PPO), polysulfone (PSF), polyether ether ketone (PEEK)), polynitrile-based resin (for example, polyacrylonitrile (PAN), polymethacrylnitrile, acrylonitrile/styrene copolymer (AS), methacrylonitrile/styrene copolymer, methacrylonitrile/styrene/butadiene copolymer), polymethacrylate-based resin (for example, polymethyl methacrylate (PMMA), poly ethyl methacrylate), polyvinyl resins (for example, vinyl acetate (EVA), polyvinyl alcohol (PVA), vinyl alcohol/ethylene copolymer (EVOH), polyvinylidene chloride (PVDC), polyvinyl chloride (PVC), vinyl chloride/vinylidene chloride copolymer, vinylidene chloride/methyl acrylate copolymer), cellulosic resins (for example, cellulose acetate, cellulose acetate butyrate), fluorine-based resin (for example, polyvinylidene fluoride (PVDF), polyvinyl fluoride (PVF), polychloro trifluoro ethylene (PCTFE), tetrafluoroethylene/ethylene copolymer (ETFE), imide-based resins (for example, aromatic polyimide (PI)), and polyacetal can be used. Commercial products may be purchased and used as these thermoplastic resins.

As the thermosetting resin, epoxy resins, phenolic resins, amino resins, unsaturated polyester resins, silicone resins, polyimide resins, polyurethane resins, aromatic hydrocarbon polymer (poly-p-phenylene, poly-p-xylene), heteroaromatic cyclic polymers (polyhydantoins, polyparabanic acid, polybenzimidazole, polybenzothiazole, polyoxadiazole, polyquinoxaline), and, thermosetting heat-resistant polymer (styrylpyridine resins, cyanate resin) may be used. In order to obtain a uniform molten material by heating, it is possible to obtain a uniform molten material by heating in the same manner as the thermoplastic resin. Commercial products may be purchased and used as these thermosetting resins.

As the rubber and elastomer, diene rubber and hydrogenized products thereof (for example, NR, IR, epoxidized natural rubber, SBR, BR (high cis BR and low cis BR), NBR, hydrogenated NBR, hydrogenated SBR), olefin rubber (for example, ethylene propylene such as ethylene propylene diene rubber (EPDM)EPM), maleic acid modified ethylene propylene rubber (M-EPM), IIR, isobutylene and aromatic vinyl or diene monomer copolymer, acrylic rubber (ACM), ionomer), halogen-containing rubber (for example, Br-IIR, Cl-IIR, isobutylene para methyl styrene copolymer (Br-IPMS), CR, hydrin rubber (CHR), chlorosulfonated polyethylene (CSM), chlorinated polyethylene (CM), maleic acid-modified chlorinated polyethylene (M-CM), silicon rubber (for example, methyl vinyl silicone rubber, dimethyl silicone rubber, methyl phenyl vinyl silicone rubber), sulfur-containing rubbers (for example. polysulfide rubber), fluorine rubber (for example, vinylidene fluoride-based rubber, fluorine-containing vinyl ether-based rubber, tetrafluoroethylene propylene-based rubber, fluorine-containing silicon-based rubber, fluorine-containing phosphazene rubber), urethane rubber, epichlorohydrin rubber, elastomers (for example, styrene-based elastomer, olefin based elastomer, ester elastomers, urethane elastomers, and polyamide elastomers) may be used. Commercial products may be purchased and used as these rubbers and elastomers.

In the present embodiment, the polymer material is preferred to be contained in the range of 30 parts by mass or more and 90 parts by mass or less when the mass of carbon fiber reinforced plastic material is 100. When the ratio of the polymer material is 30 parts by mass or more, the polymer material can be filled tightly between the carbon fibers and it is possible to maintain the physical strength of the carbon fiber reinforced plastic. In addition, when the ratio of the polymeric material is 90 parts by mass or less, it is possible to contain a sufficient amount of carbon fibers and improve the physical strength of the carbon fiber reinforced plastic. When the polymer material is 45 parts by mass or more, because it is possible to arrange the polymer material between the carbon fibers more securely, it is possible to reduce the rate of defects which is particularly preferred. In addition, when the polymer material is 80 parts by mass or less, it is possible to increase the content of carbon fibers and improve properties such as physical strength and heat resistance which is particularly preferred.

(Carbon Fiber)

Carbon fiber is a filler to provide rigidity to the carbon fiber reinforced plastic material 100. Carbon fiber is obtained by carbonization while maintaining a fiber shape by series of stepwise heating processes of an organic polymer fiber (cellulose, polyacrylonitrile) at 800° C. or more and 3000° C. or less or heat treating a spun pitch (pitch-based). It is possible to make a composite by adding to the polymeric material to increase the tensile strength. A commercial product may be purchased and used as the carbon fibers.

In the present embodiment, it is preferred that the carbon fibers are contained in the range of 10 parts by mass or more and 70 parts by mass or less when the amount of carbon fiber reinforced plastic material is 100 parts by mass.

(Nano Filler)

It is possible to use a nanofiller having a layered structure as the nanofilller which can be used in the carbon fiber reinforced plastic material 100 related to the present embodiment. A layered silicate (layer silicate) is preferred as the nanofiller having a layered structure. The layered silicate is a group of silicates having a layered structure forming a structured unit (tetrahedral sheet) spread two-dimensionally by sharing a tetrahedron surrounded Si or Al with 4 oxygen with three vertices of an adjacent tetrahedron, such as mica, mica, talc, kaolin, montmorillonite and the like. A octahedral sheet which is a two-dimensional connection of Mg, Al etc. surrounded by six oxygens or six OH groups is also an important structural component. A parallel cleavage is complete on the surface layer and generally has a form of flakes or plate-like shape. Chemically, it is a hydrous silicate such as Al, Mg, Fe, or alkali. Any of these are known and can be purchased and utilized. In the present, the use of mica as the layered silicate is particularly preferable.

Pre-feed for example (trade name, Tokuyama Corp. Anhydrous crystalline layered sodium silicate) is known as a crystalline layered silicate, and also known as a multi-function builder. It is an anhydrous crystalline layered sodium silicate. It has a layered crystal structure and it is possible to effectively incorporate a hardness component Ca++ or Mg++ of water between the layers.

A polyamide composite material layered silicate for dispersing the layered silicate in the polyamide resin is known (Japanese Patent Publication No. H7-47644). With respect to a nanocomposite material using clay particles, there is a nylon 6/montmorillonite nanocomposite obtained by ring-opening polymerization of a nylon monomer (ε-caprolactam) in the presence of organic treated montmorillonite (U.S. Pat. No. 4,739,007, Japanese Laid Open Patent S60-217396, Japanese Laid Open Patent H11-310643, Japanese Laid Open Patent 2000-136308). Although, they mention about the uniform distribution in either case, it must be said that satisfactory results are not obtained since an exceptional physical binding power is not exerted.

In the present embodiment, a nanofiller has an affinity with a polymer material and provides excellent rigidity, elasticity and heat resistance to the carbon fiber reinforced plastic material 100. Therefore, in the present embodiment, layered silicates can be suitably used as nanofillers. In the present embodiment, the nanofiller is preferred to be further added in the range of 2 parts by mass or more and 30 parts by mass or more when the mass of carbon fiber reinforced plastic material is 100. Therefore, in the present specification, the total amount of carbon fiber reinforced plastic material is 102 parts by mass or more and 130 parts by mass or more. When a layered silicate as the nanofiller is dispersed in a matrix of polymeric material 110 by the manufacturing method described below, the layers of the layered silicate are peeled off and dispersed. Since the thickness of each layer of the layered silicate is very thin, the layered silicate that was peeled off in one to several layers adheres to the polymer material 110 as the nanofiller having a high aspect ratio.

As described above, the carbon fiber reinforced plastic material 100 related to the present embodiment has a structure in which carbon fibers 130 and nanofiller 150 are dispersed and arranged microscopically throughout the matrix of the polymeric material 110. In addition, in order to have affinity for the polymer material 110, nanofillers 150 are attached to the polymer material 110 as well as being dispersed throughout the matrix of the polymeric material 110. The carbon fiber reinforced plastic material related to the present embodiment having such a structure does not reduce the characteristics of the polymeric material obtained by dispersing carbon fibers, while maintaining the desired stiffness as an entire system. In this way, the carbon fiber reinforced plastic material according to the present embodiment can be provided with excellent rigidity and elasticity and can improve heat resistance. The carbon fiber reinforced plastic material related to the present exemplary embodiment may have a modulus of elongation of 6000 MPa or more.

The carbon fiber reinforced plastic material related to the present embodiment described above may be used as auto parts or sport parts. Since automotive parts and information equipment terminal parts are used around the world, it is necessary to provide physical characteristics such as environmental resistance and durability and heat resistance and it is particularly desirable that carbon fibers or fillers are contained at a high ratio. In addition, physical strength and rigidity is particularly required in sports parts, and preferably contains carbon fiber or filler at a high ratio. Since auto parts, sport parts and information equipment terminal parts including a carbon fiber reinforced plastic material related to the present embodiment can contain carbon fibers and nanofillers at a high ratio which cannot be achieved in a usual dispersion method, the characteristics of the polymeric material obtained by dispersing carbon fibers does not decrease while maintaining the desired rigidity as the entire system. In this way, auto parts, sports parts and information equipment terminal parts related to the present embodiment can be provided with excellent rigidity, elasticity and can further improve physical properties such as heat resistance.

(Method of Producing a Carbon Fiber Reinforced Plastic Material)

As the apparatus used in the melt-kneading process for manufacturing the carbon fiber reinforced plastic material related to the present embodiment, it is preferable that an apparatus which can also provide a stretching field as well as shear flow field. For example, a shear flow field is provided between a screw and cylinder and a stretching field is provided when passing through screw feedback hole 44 in FIG. 3. An apparatus which can provide these types of fields is sufficient.

As described above, in the carbon fiber reinforced plastic material related to the present invention, there is a characteristic that a high shear molding process is used to disperse and arrange a nanofiller microscopically in a plastic. A high shear molding process related to the present embodiment is explained below.

FIG. 2 is a schematic diagram showing a melt-kneaded product manufacturing apparatus related to the present embodiment. Melt-kneaded product manufacturing apparatus 10 is formed from a raw material supply unit 14 of a polymer material, carbon fibers and nanofiller which are raw materials, a melt kneading section 12 and mold part 14.

Figure 3:
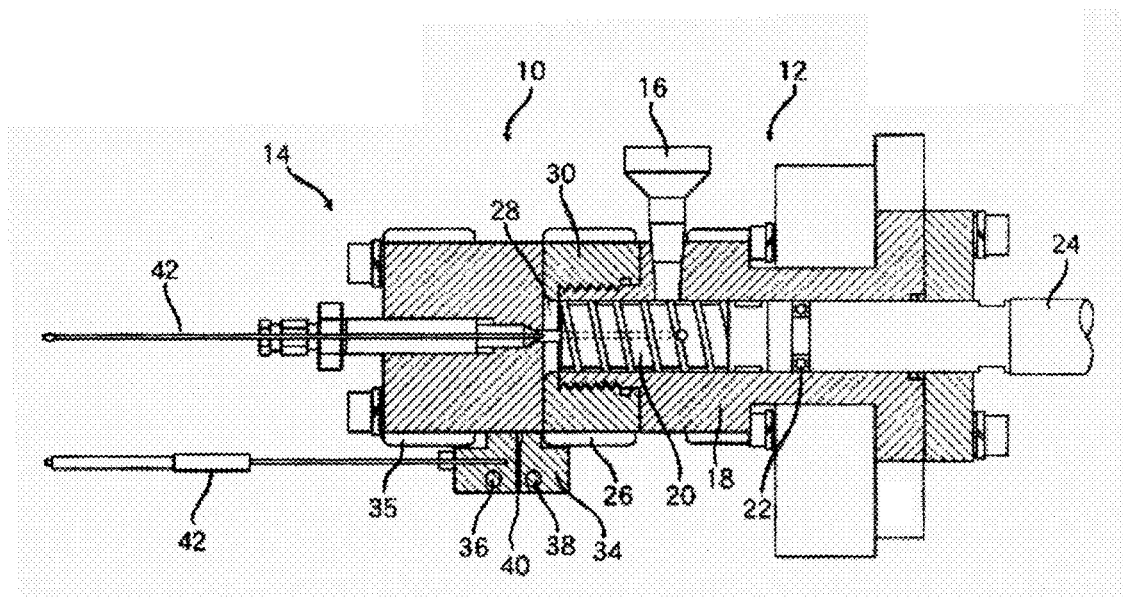
FIG. 3 is a schematic diagram showing a melt-kneaded product manufacturing apparatus according to an embodiment of the present invention.
Figure 4:
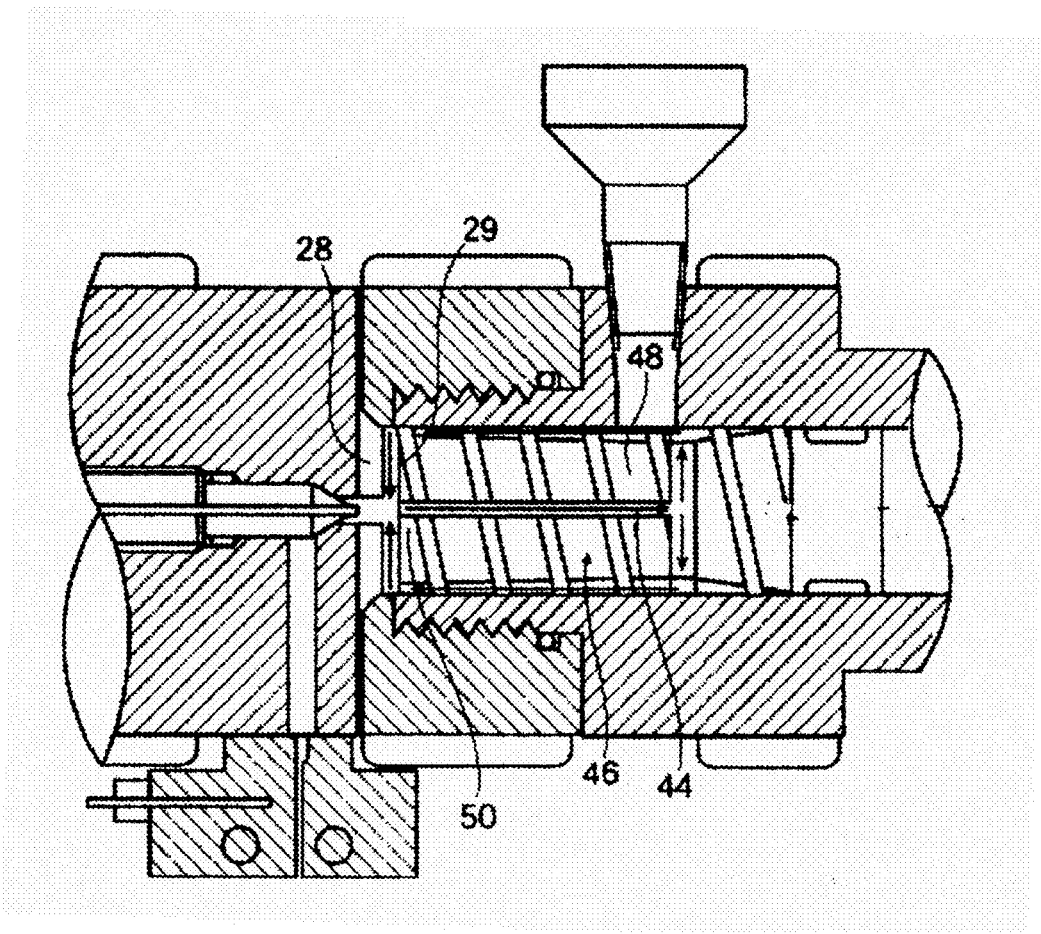
FIG. 4 is a schematic diagram showing a melt-kneaded product manufacturing apparatus according to an embodiment of the present invention.
Figure 5:
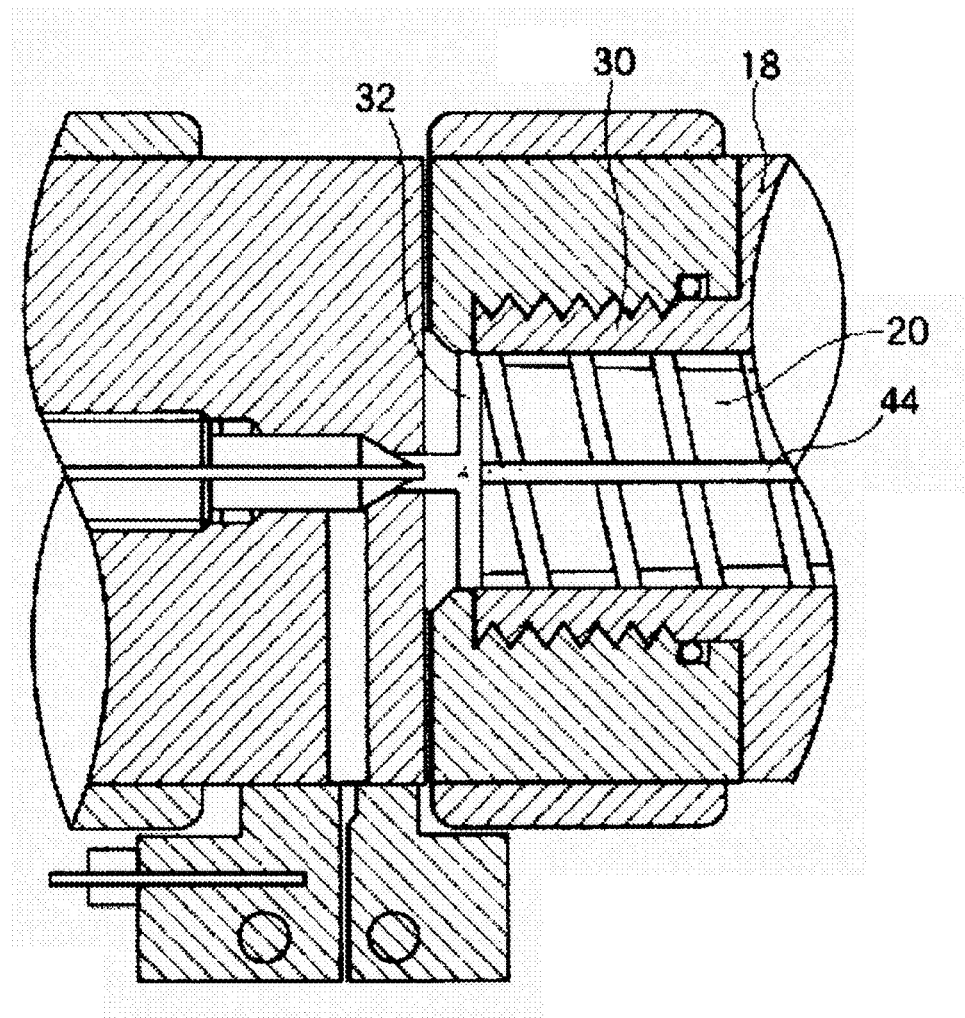
FIG. 5 is a schematic diagram showing a melt-kneaded product manufacturing apparatus according to an embodiment of the present invention.

Melt-kneading part 12 has an internal feedback type screw 20 in the cylinder 18. Internal feedback type screw 20 is placed in the cylinder 18 through a shaft 24 to. Shaft 24 links with the internal feedback type screw 20 via a bearing 22. A heater 26 for melting the polymeric material is arranged along the outside of the cylinder 18. A seal 28 for sealing between the melt-kneading section 12 and the molding part 14 in the cylinder 18 is provided at the end opposite the location where the shaft 24 is located. In addition, an adjustment means 30 for adjusting a gap 32 is provided between a tip end surface 29 and seal surface 28 of the internal feedback type screw 20. Gap 32 can be adjusted in the range of 0.5 mm or more and 5 mm or less (FIG. 3 and FIG. 4).

Molding apparatus 14 includes an extrusion unit heater 35 and a T-die 34 for manufacturing a film. T-die 34 has a T-die front end unit heater 36 and T-die rear end unit heater 38. A film which is extracted passes through a discharge opening 40 which is formed between the T-die front end unit heater 36 and the T-die rear end unit heater 38. A thermocouple 42 is inserted for temperature measurement within the molding part and the T-die front end unit heater. The measurement results are sent to a control device (not shown in the diagram) and the temperature of the melt-kneading part 12 and the T-die is adjusted.

The screw 20 includes an internal hole 44 having an internal diameter between 1 mm or more and 5 mm or less, and more preferably between 2 mm or more and 3 mm or less. The L/D ratio (L: length, D: diameter) of the internal feedback type screw 20 is 1.78. The rotation speed of the screw is adjusted within a range of 100 rpm or more and 3000 rpm or less, and the corresponding shear rate can be adjusted within a range of 150 $sec^{-1}$ or more and 4500 $sec^{-1}$ or less. The temperature within the cylinder varies according to the polymeric material which is to be melted.

The screw has a structure sufficient to melt the polymeric material in the cylinders. A structure 46 of the internal feedback type screw is shown in FIG. 3. Within the structure 46 of the internal feedback type screw, a polymer material supplied from the screw rear section 48 is moved to the screw front section 50 using a screw. Molten polymer material is confined in the gap 32 formed between the front surface 29 and sealing surface 31. The polymer material is directed toward the front section 50 of the screw again via a hole 44 in a horizontal direction arranged on the center part of the screw, passes through a hole facing in a different direction and via the screw rear portion 48.

The time required for shear melting can be changed according to the time required to cycle through the structure 46 of the internal feedback type screw. The extent to which the polymeric material is sheared may be increased by narrowing the diameter of the hole. It is necessary to optimize the internal diameter of the gap and hole from the viewpoint of the viscosity of the polymeric material. The time required to melt-knead a polymer material contained in the cylinder is 10 seconds or more and 8 minutes or less.

Describing in more detail the method of manufacturing a carbon fiber reinforced plastic material related to the present embodiment, polymeric material, carbon fiber and nanofiller are inserted from raw material feeding unit 16 and supplied to the melt-kneading section 12 which has a heating unit in the cylinder arranged with screw 20 and sent forward by the action of the internal feedback type screw 20.

A melt-kneaded polymer material obtained by processing under the conditions where the number of revolutions of the screw is 200 rpm or more and 3000 rpm or less and a shear rate of 300 $sec^{-1}$ or more and 4500 $sec^{-1}$ or less, is sent to the tip end direction from near the rear end of the screw. After being trapped in the gap 32 of the tip end of the screw, it is shifted to the rear end direction of the screw through the hole 44 disposed in the central part of the screw from the gap 32. Gap 32 can be adjusted in the range of 0.5 mm or more and 5 mm or less (FIG. 3 and FIG. 4).

A bulking agent consisting of a filler passes through the hole 44 in a horizontal direction which is provided in the central part of the screw in a state of being uniformly dispersed in a melted polymer material, becomes trapped by the screw rear end, and is sent back again to the screw front section 50 by the screw again via the screw rear end part 48. The cycle is repeated between 10 seconds or more and 8 minutes or less and becomes a state where the bulking agent consisting of a filler is uniformly dispersed through the polymer material.

The melt heating temperature is set to a room temperature or a higher temperature condition than the melt-kneading temperature of the polymer material which is melt-kneaded. If the melting temperature of the melt-kneaded polymer material is lower than room temperature, the melting heating temperature is set to room temperature. In addition, if the melting temperature of the melt-kneaded polymer material is higher than room temperature, the melting heating temperature is set to the melting temperature of the melt-kneaded polymer material.

In the case where the number of rotations of the screw is less than 200 rpm, and the shear rate less than 300 $sec^{-1}$, a melt-kneading operation is not sufficiently performed and a satisfactory result cannot be obtained. On the other hand, even if processing is performed when the number of rotations of the screw exceeds 3000 rpm and the shear rate exceeds 4500 $sec^{-1}$, a marked result cannot be obtained even when the state of the melt-kneading is observed. These results suggest that it is important to process under the conditions of the number of rotations of the screw of 200 rpm or more and 3000 rpm or less and a shear rate of 300 $sec^{-1}$ of more and 4500 $sec^{-1}$ or less. With respect of the shape of the screw, apart from there being a hole for feeding back the sample, any shaped screw may be used.

A circulating operation is repeated for 10 seconds or more and 8 minutes or less and the bulking agent consisting of a filler is extracted to the mold apparatus 14 from the gap 28 in a state where it is uniformly dispersed in the melted polymer material. In this case, it is extracted to the mold apparatus 14 by opening a valve (not shown in the diagram).

An extrusion unit heater 35 and a T-die 34 for manufacturing a film is also included. T-die 34 has T-die front end unit heater 36 and T-die rear end unit heater 38. A film which is extruded is extracted through a discharge opening 40 which is formed between the T-die front end unit heater 36 and the T-die rear end unit heater 38. A thermocouple 42 is inserted for temperature measurement within the molding part and the T-die front end unit heater. The measurement results are sent to a control device (not shown in the diagram) and the temperature of the melt-kneading part 12 and the T-die is adjusted. Furthermore, the structure of the melt-kneaded product manufacturing apparatus is not limited thereto, and may have an internal feedback screw having an internal bore in the screw provided in the cylinder, and the internal-feedback screw may be able to rotate at the speed described above.

As explained above, according to the method of producing a carbon fiber reinforced plastic material related to the present embodiment, a layered silicate is dispersed by peeling the layers and the polymer material 110 is adhered as a nanofiller arranged with a high aspect ratio. In the present, in order to disperse and arrange a nanofiller microscopically in a plastic, a carbon fiber reinforced plastic material does not reduce the characteristics of a polymer material dispersed with carbon fibers while maintaining the desired stiffness as a whole system. In this way, the carbon fiber reinforced plastic material related to the present embodiment can be provided with excellent rigidity and elasticity and can improve heat resistance. It is difficult to achieve the structure whereby carbon fibers and a nanofiller are dispersed and arranged microscopically throughout the matrix of a polymeric material with the conventional kneading method, but it is possible to be realized by the manufacturing method related to the present embodiment.

EXAMPLES

A carbon fiber reinforced plastic material related to the present invention described above is explained in more detail with reference to examples.

Examples 1 to 3

In the present example, polyamide 6 (M1040 manufactured by Unitika Ltd.) was used as a polymer material. As a carbon fiber, SIGRAFIL C30 S006 PUT manufactured by SGL Carbon Corp was used. In addition, commercially available PYROFIL pellets (N6MR-C-30B) manufactured by Mitsubishi Rayon Co., Ltd were also used as a comparison containing 30% parts by mass of carbon fiber in the polyamide 6 from the beginning. Mica (manufactured by CO-OP Chemical Co., Ltd. Somasif MEE) was used as a nano-filler. The mixing ratio of the carbon fiber reinforced plastic raw materials was polyamide 6:carbon fiber: mica=70:30:5.

Prior to mixing, the polyamide 6, carbon fiber and mica were dried for at least 12 hours at 80° C. (under a vacuum). A carbon fiber reinforced plastic raw material of the mixing ratio described above was put into a high-shear molding machine HSE3000mini manufactured by Imoto Seisakusho (Japan) Ltd and were melt-kneaded for 1 minute at 240° C. to 250° C., at a rotation speed of the internal feedback type screw of 300 rpm (Example 1), 900 rpm (Example 2), 1800 rpm (Example 3). After grinding the carbon fiber reinforced plastic raw material mixture, a sheet was obtained by hot press molding at 250° C. The same results were obtained using fully automatic high-shear molding device (NHSS2-28) manufactured by Niigata Machine Techno Co. Ltd. as the melt-kneading equipment.

Examples 4 to 5

As an example, clay (Southern Clay Product Inc. Cloisite 30B) instead of the mica was used as the nanofiller. Because the other conditions were the same as in Example 1, a detailed description thereof is omitted. Furthermore, melt-kneading was performed for 1 minute each at a rotation speed of the internal feedback type screw of 300 rpm (Example 4), 900 rpm (Example 5).

Comparative Example 1

In addition, carbon fiber reinforced plastic (polyamide 6: carbon fiber=70:30) without the addition of a nanofiller was used as Comparative Example 1.

Example 6, Comparative Example 2

In the present example, Polyamide 610 (manufactured by Toray, Amilan CM2001) was used as a polymer material. As the carbon fiber, SIGRAFIL C30 S006 PUT manufactured by SGL Carbon Corp. was used. Mica (Manufactured by CO-OP Chemical Co., Ltd. Somasif MEE) was used as a nano-filler. The mixing ratio of the carbon fiber reinforced plastic raw material was polyamide 610:carbon fiber: mica=70:30:5. In addition, a composition of polyamide 610:carbon fiber=70:30 without the addition of nano filler was used as Comparative Example 2. Melt-kneading was performed for 1 minute each, with the screw rotation speed at 900 rpm.

Comparative Example 3

Without the addition a carbon fiber reinforced plastic, polyamide 12 (Grilamid L25 manufactured by EMS Co.) was used as a polymer material. Mica (manufactured by Co-op Chemical Co., Ltd. Somasif MEE) was used as a nanofiller. A melt-kneaded product with a composition of polyamide 12: mica=85:15 for 1 minute at 900 rpm was used as Comparative Example 3.

(Tensile Properties)

A sheet of carbon fiber reinforced plastic of the Examples and Comparative Examples was punched out with a cutter into a dumbbell-shaped specimen. Testing of tensile properties was performed in accordance to the method defined in ASTM D638. The strain-stress curves were measured in a tensile mode using a tensile tester manufactured by ORIENTEC (Tensilon UTM-300). This test was performed at 23° C. in an atmosphere of 50% relative humidity and at a crosshead speed of 10 mm/min.

Figure 6:
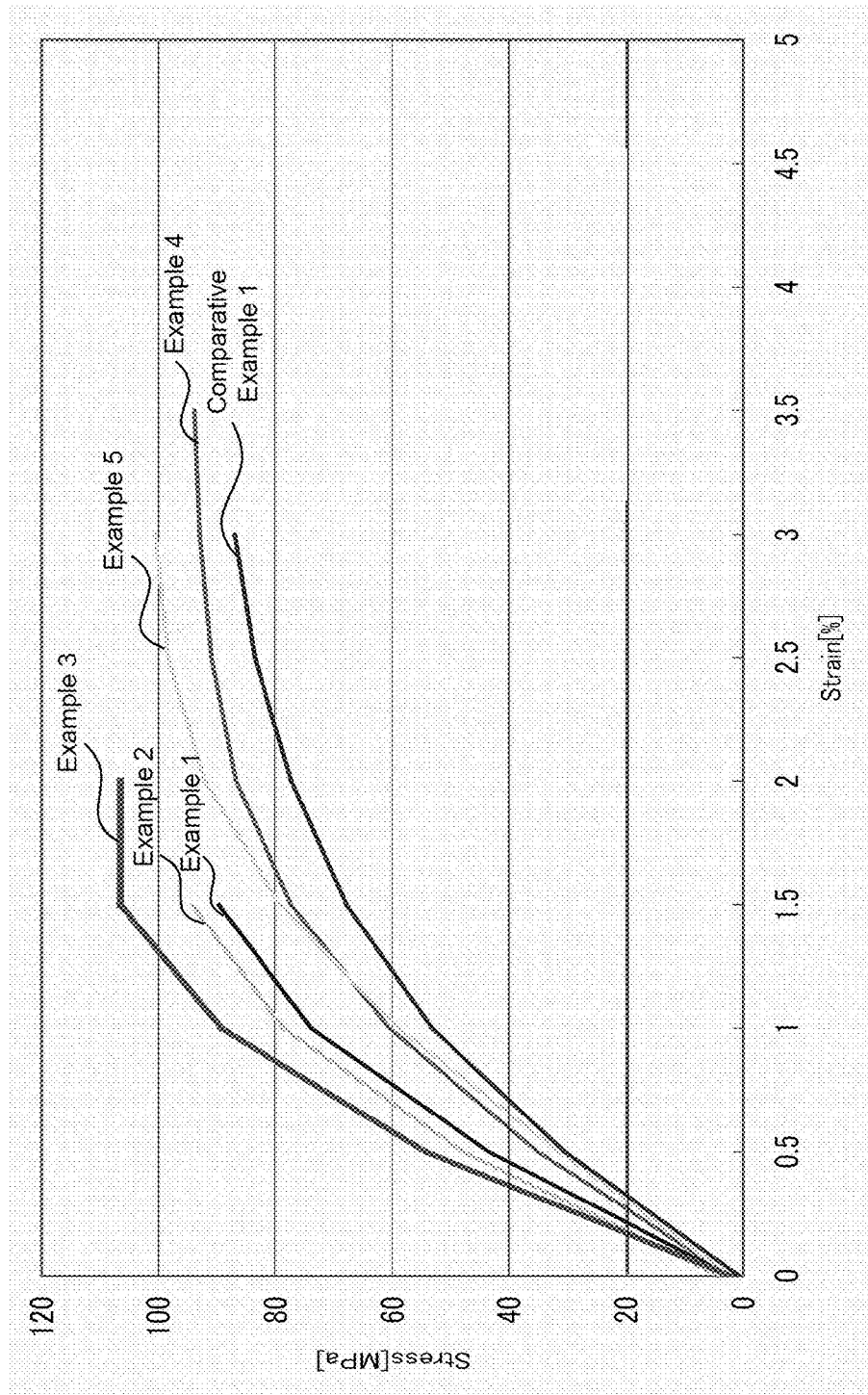
FIG. 6 is a diagram showing a stress-strain characteristic according to an embodiment of the present invention.
Figure 7:
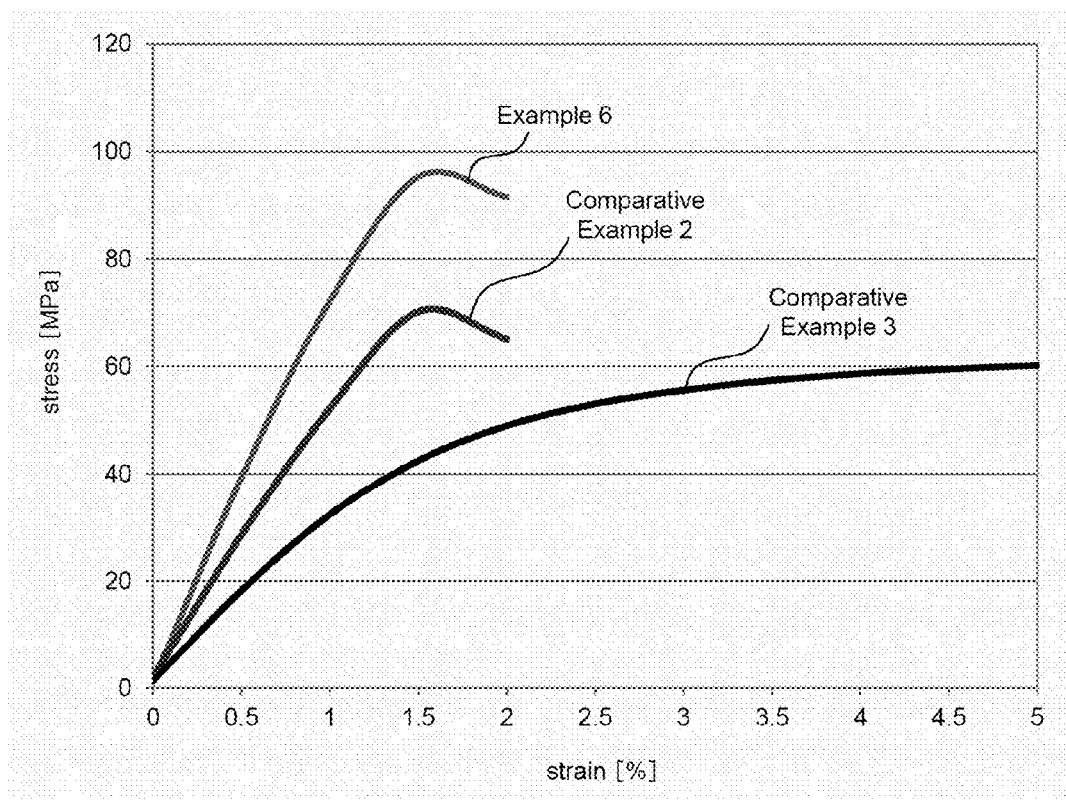
FIG. 7 is a diagram showing a stress-strain characteristic according to an embodiment of the present invention.

FIG. 6 and FIG. 7 show the stress—strain characteristics related to the present embodiment. Table 1 shows modulus of elongation and breaking elongation related to the present embodiment and Comparative Examples.

TABLE 1

| Samples | Modulus of elongation (MPa) | Breaking elongation (%) |
|---|---|---|
| Example 1 | 8,332 | 1.5 |
| Example 2 | 8,752 | 1.5 |
| Example 3 | 10,497 | 2.0 |
| Example 4 | 6,580 | 3.5 |
| Example 5 | 6,111 | 3.0 |
| Comparative Example 1 | 4,934 | 3.0 |
| Example 6 | 7,982 | 1.9 |
| Comparative Example 2 | 5405 | 2.3 |
| Comparative Example 3 | 3160 | 147 |

From the results in FIG. 6, it is clear that the tensile strength improves as the rotational speed of the internal feedback type screw increases. In addition, from the results of Table 1, in the Examples, it is clear that modulus of elongation improves as the rotational speed of the screw increases. That is, it is presumed that by dispersing and arranging microscopically a layered silicate in a carbon fiber reinforced plastic by high-shear molding a carbon fiber reinforced plastics raw material, the modulus of elongation improves. Furthermore, in general, it is known that when the carbon fiber increases, poor dispersion occurs and modulus of elongation decreases. In the present invention, by dispersing a raw material until an aspect ratio of the nanofiller is 20 or more, since the carbon fibers are also well dispersed, even when the carbon fiber is increased by 50 parts by mass, it is confirmed that modulus of elongation is not reduced. The same applies to the nano fillers whereby even when increased up to 20 parts by mass, it was confirmed that the modulus of elongation is not reduced. In addition, examples in the case where the polymer material used was polyamide 610 and polyamide 12 are used as Example 6 and Comparative Example 2 and Comparative Example 3 respectively and the stress—strain characteristics thereof are shown in FIG. 7. Because only mica is added at a smaller amount (15 wt %) as the nanofiller in Comparative Example 3, it is clear that although it was excellent in stretching break (147%), the elastic modulus decreases significantly since a predetermined amount of carbon fibers is not added. Similarly, it was confirmed that a good modulus of elongation is exhibited even when polyamide 1010 or polyamide 66, even when using polyamide 10T or polyamide 9T, polyether ether ketone, poly-p-phenyl sulfide, poly butyl terephthalate, polyether sulfone were used as the polymer material.

(Structure Observation)

A sample was prepared using the same processing conditions in the Examples in order to grasp the state of dispersion of a layered silicate (mica) in the polyamide 6 described above. In this case, in order to prevent the size of the observation field of view becoming too large and prevent the dispersion state of the layered silicate from being unclear, the samples were prepared without the addition of carbon fibers. That is, the composition of the samples prepared in the structure observation was polyamide 6: mica=100:5. Upon observation of this polyamide 6 mica based structure, a sample was embedded and subjected to observation transmission electron microscope (TEM) by preparing ultrathin sections. The TEM observation used LEO 922 and was measured at an accelerating voltage of 200 kV.

Figure 8:
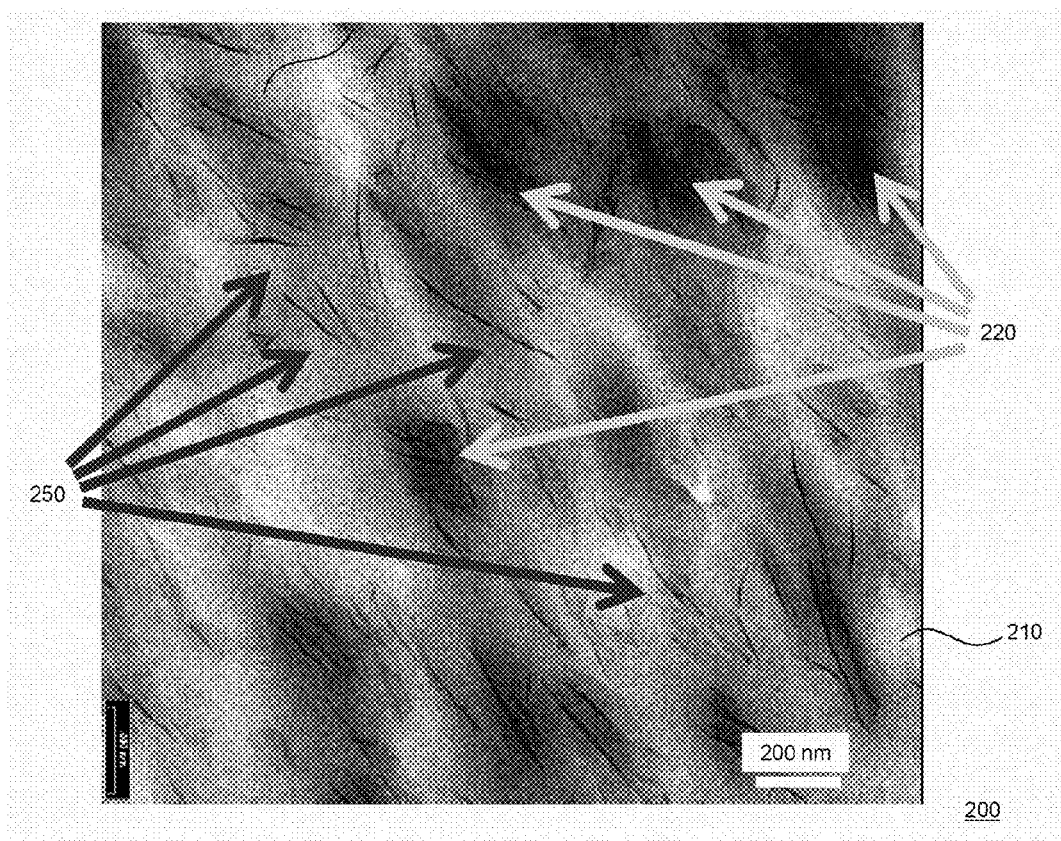
FIG. 8 is a TEM image of the plastic material 200 according to one embodiment of the present invention.
Figure 9:
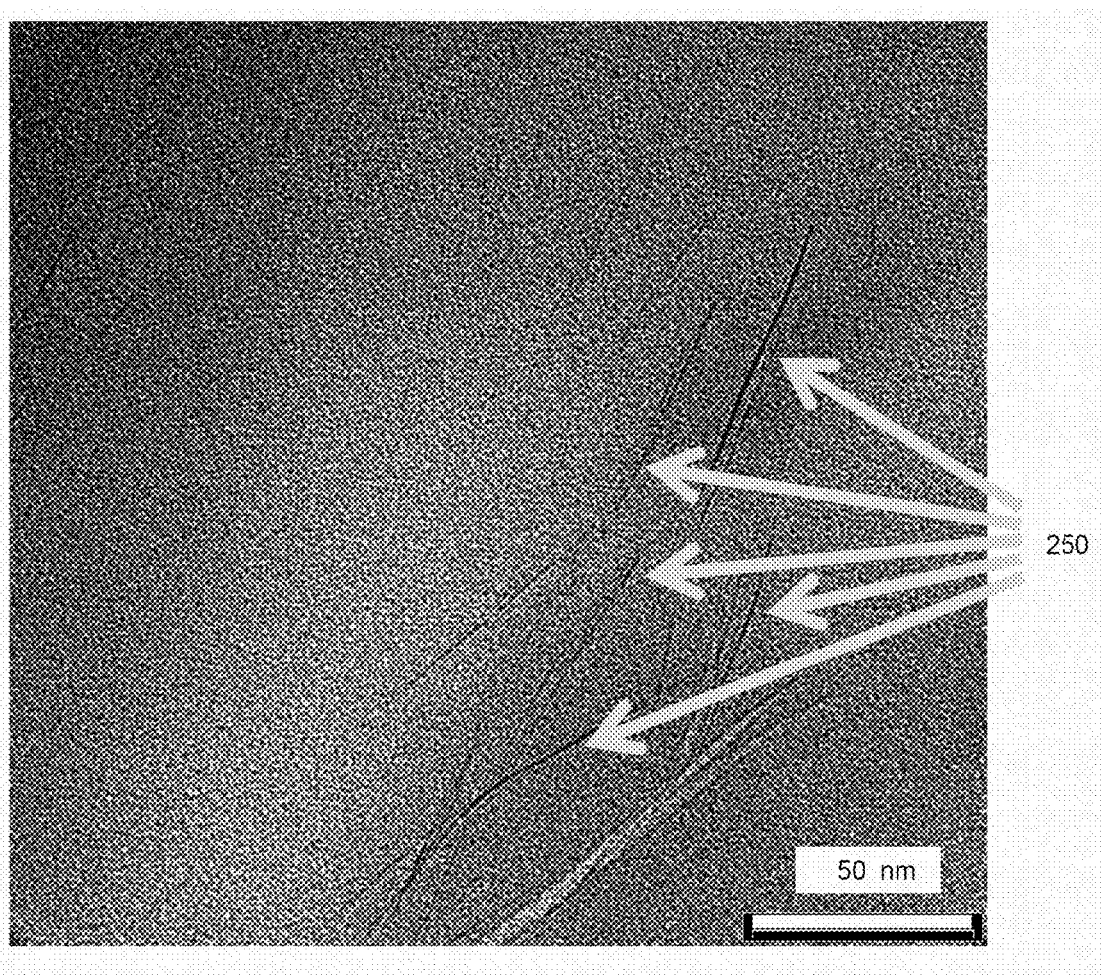
FIG. 9 is a TEM image of the plastic material 200 according to one embodiment of the present invention.
Figure 10:
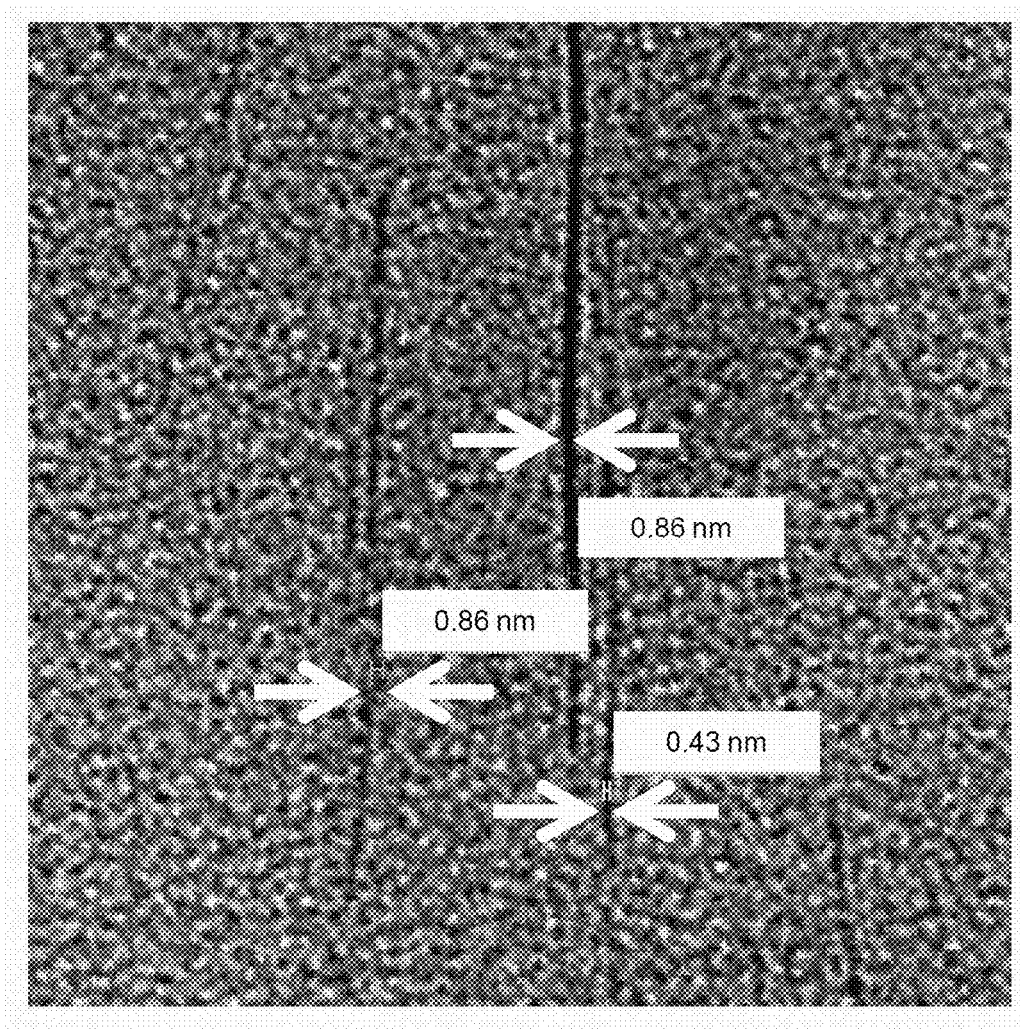
FIG. 10 is a TEM image of the plastic material 200 according to one embodiment of the present invention.

FIG. 8 is a TEM image of the plastic material 200 related to the present embodiment. In FIG. 8, what has become a black mass is a crystallized part 220 of polyamide 6. This is because after the mica 250 was peeled and dispersed within the polyamide 6, in the cooling process, the peeled and dispersed mica 250 acts as a nucleus of the crystal and the polyamide 6 was crystallized. It is clear that the mica 250 peeled in other places and was dispersed in the shape of hair. FIG. 9 shows an enlarged observation at a higher magnification of this part. In FIG. 10, an evaluation is shown of the thickness of the peeled layer of mica 250 using a higher magnification. As is shown in the diagram, the thinnest thickness of one mica was estimated to be 0.43 nm and a slightly thicker one was 0.86 nm. These are one layer and two layer mica respectively. Therefore, it is clear that the aspect ratio (length/width) of mica peeled and dispersed in this way becomes 100 or more. In addition, the series of results in FIGS. 8 to 10 are the results of experimentally verifying the dispersion state shown schematically in FIG. 2. Furthermore, FIGS. 8 to 10 confirm that although they are samples when the rotation speed is 900 rpm, mica dispersed at 300 rpm is dispersed up to less than 6 layers on average. Furthermore, the average value is an average value wherein 20 micas are randomly extracted from a TEM photograph and the number of layers is counted. In addition, it was possible to obtain a good dispersion state as in FIGS. 8 to 10 even when mica is dispersed in place of the polyamide 610 and polyamide 12 from polyamide 6.

According to the present invention, a carbon fiber reinforced plastic material with excellent rigidity and flexibility and improved heat resistance and a manufacturing method thereof can be realized.

As described above, a carbon fiber reinforced plastic material obtained by mixing a nanofiller and a method of manufacturing the same related to the present invention is a technology that can easily improve the mechanical performance of the carbon fiber reinforced plastic by realizing microscopic dispersion and arrangement of a nanofiller in the carbon fiber reinforced plastic material.

The invention claimed is:

1. A carbon fiber reinforced plastic material comprising: 2 parts by mass or more and 30 parts by mass or less of a layered silicate with respect to a total of 100 parts by mass of 30 parts by mass or more and 90 parts by mass or less of polyamide and 70 parts by mass or less and 10 parts by mass or more of carbon fibers, a width of the layered silicate being about 2 nm or less,
wherein the layered silicate and the carbon fibers are dispersed in a non-oriented state in the polyamide in a transmission electron microscope (TEM) observation of an ultrathin section of the carbon fiber reinforced plastic material, and
the layered silicate is in the shape of hair.

2. The carbon fiber reinforced plastic material according to claim 1, wherein a modulus of elongation of carbon fiber reinforced plastic material in accordance to the method defined in ASTM D638 is 6000 MPa or more.

3. The carbon fiber reinforced plastic material according to claim 1, wherein the layered silicate dispersed in the carbon fiber reinforced plastic material has an average value less than 6 layers when 20 layered silicates are randomly extracted from a TEM photograph and the number of layers is counted.

4. An automobile part comprising the carbon fiber reinforced plastic material according to claim 1.

5. A sports part comprising the carbon fiber reinforced plastic material according to claim 1.

6. An information terminal device part comprising the carbon fiber reinforced plastic material according to claim 1.

7. A carbon fiber reinforced plastic material comprising: 2 parts by mass or more and 30 parts by mass or less of a layered silicate with respect to a total of 100 parts by mass of 30 parts by mass or more and 90 parts by mass or less of polyamide and 70 parts by mass or less and 10 parts by mass or more of carbon fibers,
wherein
the layered silicate and the carbon fibers are dispersed in a non-oriented state in the polyamide in a transmission electron microscope (TEM) observation of an ultrathin section of the carbon fiber reinforced plastic material,
the layered silicate is in the shape of hair,
the layered silicate is a mica, and
the mica has a thickness of 0.43 nm or more and 0.86 nm or less.

8. The carbon fiber reinforced plastic material according to claim 7, wherein a modulus of elongation of carbon fiber reinforced plastic material in accordance to the method defined in ASTM D638 is 6000 MPa or more.

9. The carbon fiber reinforced plastic material according to claim 7, wherein the polymer material is selected from a thermoplastic resin, a thermosetting resin and elastomer or rubber.

* * * * *